United States Patent [19]

Stucka et al.

[11] 4,240,335

[45] Dec. 23, 1980

[54] FLOATING SEAL FOR FLUIDIC DEVICES

[75] Inventors: Edward P. Stucka, Deerfield; Harald G. Trautmann, Glen Ellyn, both of Ill.

[73] Assignee: Honeywell Inc., Minneapolis, Minn.

[21] Appl. No.: 103,246

[22] Filed: Dec. 13, 1979

Related U.S. Application Data

[63] Continuation of Ser. No. 882,685, Mar. 2, 1978, abandoned.

[51] Int. Cl.³ .............................................. F16J 3/02
[52] U.S. Cl. ......................................... 92/96; 92/94; 92/101
[58] Field of Search ............... 92/94, 98 R, 98 D, 92, 92/101, 102, 50, 75, 105, 96; 277/3, 27; 138/30; 220/85 B

[56] References Cited

U.S. PATENT DOCUMENTS

| | | |
|---|---|---|
| 1,085,818 | 2/1914 | Oxnard . |
| 2,678,663 | 5/1954 | Chyba . |
| 3,038,501 | 6/1962 | Greer . |
| 3,082,792 | 3/1963 | Jenkins .................................. 92/101 |
| 3,379,216 | 4/1968 | Mercier . |
| 3,744,381 | 7/1973 | Travaglio ........................... 92/98 D |
| 3,907,000 | 9/1975 | Carr . |

Primary Examiner—Abraham Hershkovitz
Attorney, Agent, or Firm—Trevor B. Joike

[57] ABSTRACT

A floating seal fluidic device is disclosed comprised of a housing, a connector which has a nozzle extending through the housing and which forms a clearance with the housing, a diaphragm stretched around the circumference of the connector and having a bead which lies within the clearance wherein the connector, the housing and the bead are so dimensioned that, without fluid being supplied to the nozzle, the bead within the clearance is floating and that, with fluid being supplied to the nozzle, the bead is forced into the clearance between the connector and the housing to provide the seal.

16 Claims, 3 Drawing Figures

FLOATING SEAL FOR FLUIDIC DEVICES

This is a continuation of application Ser. No. 882,685, filed Mar. 2, 1978 and now abandoned.

BACKGROUND OF THE INVENTION

This invention relates to floating seals for fluidic devices and, particularly, to pneumatic actuators having a diaphragm forming the seal between the actuator housing and the air chamber.

Many prior art diaphragm devices have taken advantage of their existing diaphragms to seal in the fluid to which the diaphragms are responsive. The seals are provided by compressing the bead around the circumference of the diaphragm against the device housing to insure that the fluid being sealed into the fluid chamber defined by the diaphragm cannot escape from the housing around the bead. This compression is applied to the bead either by tightening a nut which presses the bead against the housing or by using a spring or other suitable biasing means to press the bead against the housing. Because a mechanism is required to compress the bead against the device housing in these prior art devices, assembly of such devices has proven to be more complicated and costly than necessary. The present invention reduces the complexity and cost of assembly of the device by dispensing with the compressing mechanism and rather compressing the bead against the housing by use of the fluid which is supplied to the fluidic device. In this arrangement, the diaphragm and the bead of the diaphragm are allowed to float in the housing when no fluid is supplied to the device.

SUMMARY OF THE INVENTION

A fluidic device is provided having a housing, a connector mounted within the housing having a nozzle extending through the housing, the connector forming a clearance between it and the housing, and a diaphragm mounted within the housing forming a fluid chamber within the device and having a bead around the circumference of one end of the diaphragm, the bead being positioned within the clearance between the connector and the housing such that when fluid is supplied through the nozzle to the fluid chamber, the fluid will force the bead into the clearance to seal in the fluid within the fluid chamber formed by the diaphragm. The connector, the housing and the bead are so dimensioned that, without fluid supplied to the nozzle, the bead within the clearance is floating.

BRIEF DESCRIPTION OF THE DRAWINGS

These and other features and advantages will become apparent from a detailed consideration of the drawings in which.

DETAILED DESCRIPTION OF THE INVENTION

Figure 2:
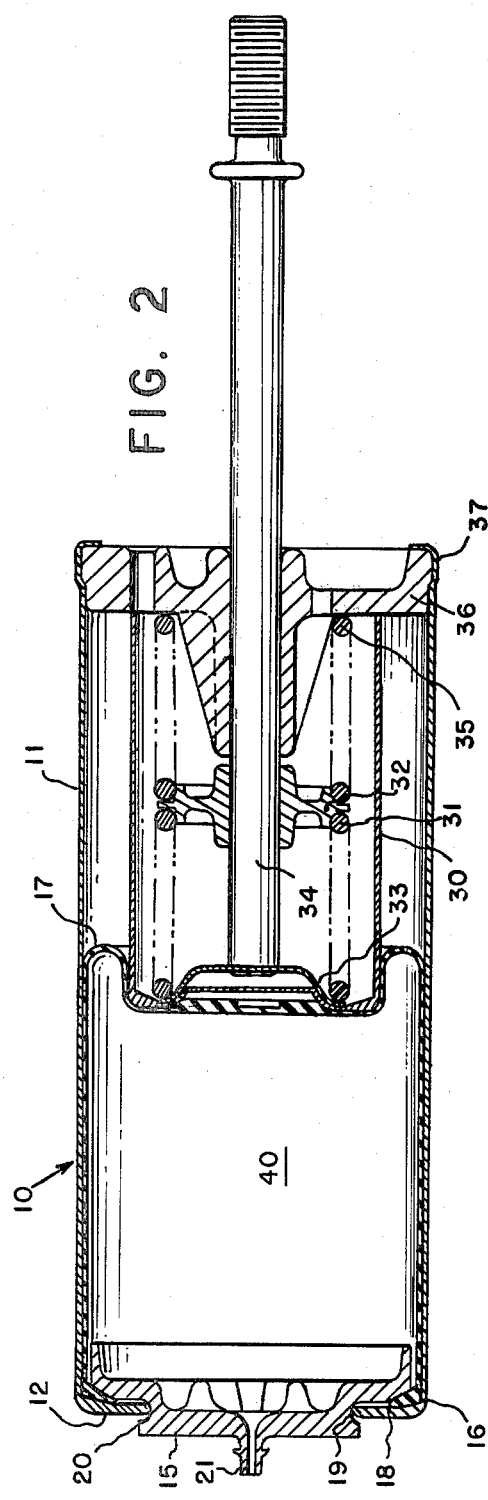
FIG. 2 shows the device of FIG. 1 in its energized state.
Figure 3:
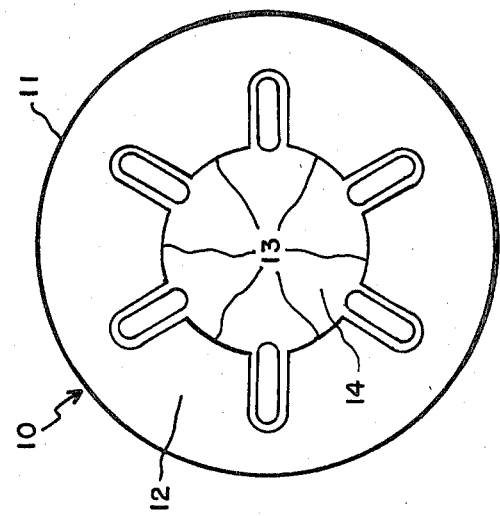
FIG. 3 is an end view of the housing of FIG. 1.
Figure 1:
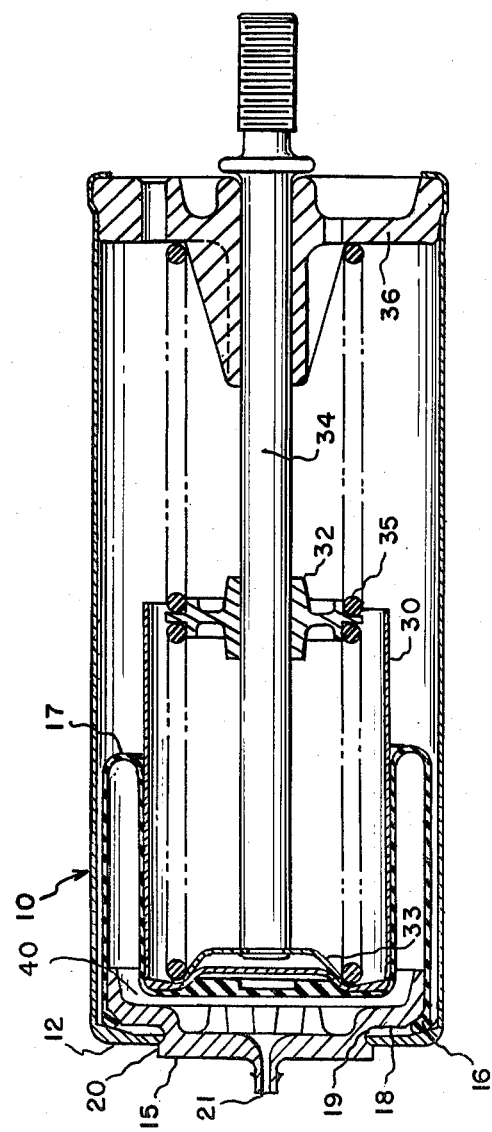
FIG. 1 is a sectional view of a pneumatic actuator, in its de-energization state, incorporating the invention.

The fluidic device 10 shown in FIGS. 1 and 2 comprises cylindrical cup-shaped housing 11 having its bottom 12 rolled under and cut out leaving a plurality of burrs 13 and a circular cutout 14 as shown in FIG. 3. A generally cup-shaped connector 15 has bead 16 at one end of the generally cup-shaped diaphragm 17 stretched over its circumference. After the diaphragm has been stretched over connector 15, connector 15 is inserted through opening 14 at end 12 of cylinder 11 such that bead 16 lies within clearance 18 formed between cylinder 11 and connector 15 as shown. Connector 15 has an annular recess 19 around its circumference to form an annular tab 20 therearound. As the connector 15 is inserted through opening 14 of end 12, burrs 13 of cylindrical housing 11 snap over annular tab 20 of connector 15 and into recess 19.

The burrs 13 of housing 11 and the tab 20 of connector 15 are provided to prevent the connector 15 from being pushed into housing 11 when the piping is pushed onto nozzle 21 during installation. However, connector 15, end 12 of housing 11 and bead 16 of diaphragm 17 are so formed that the connector 15 and diaphragm 17 together with bead 16 are floating inside the housing 11; that is, there is no force applied against the connector 15 to compress bead 16 between connector 15 and housing 11. By allowing connector 15 and diaphragm 17 to float within housing 11, the assembly of the device 10 is made much less complicated and has eliminated the need for a separate bead compressing device.

As fluid is supplied through nozzle 21 of connector 15 to chamber 40 formed by diaphragm 17, chamber 40 expands and the fluid within diaphragm 17 forces bead 16 into clearance 18 formed between connector 15 and housing 11.

It may be found that, for small input pressures to nozzle 21, the pressure within chamber 40 is inadequate to force bead 16 into the clearance sufficiently to form a fluid tight seal; that is, when the input pressure is less than 2 psi, for example, a small leak may occur around bead 16. It has been found that, when the input pressure exceeds 2 psi, there is sufficient pressure within chamber 40 to force bead 16 into clearance 18 to seal off any leakage. Thus, in order to prevent leakage for input pressures less than 2 psi, for example, it may be necessary to make the circumference of diaphragm 17 at bead 16 slightly smaller than the circumference of connector 15 so that the diaphragm 17 must be stretched over connector 15 during assembly. Thus, an interference fit is formed between diaphragm 17 and connector 15 such that, at low input pressures, for example, below 2 psi, the pressure within diaphragm 17 is insufficient to move bead 16 away from connector 15.

To complete the assembly of the device 10, cup 30 is inserted into the housing 11 and against diaphragm 17 to roll back diaphragm 17 as shown in FIG. 1. A first biasing spring 31 operates between a spring support 32 and a spring pad 33 attached to shaft 34. A second biasing spring 35 operates between spring support 32 and end cap 36. End cap 36 is roll staked at 37 to cylindrical housing 11 and shaft 34 extends therethrough. Biasing springs 31 and 35 bias shaft 34, cup 30 and diaphragm 17 to a de-energized position with no fluid supplied at nozzle 21. This position of de-energization is insufficient, however, to place any compression upon the bead 16 in clearance 18 between connector 15 and housing 11. Indeed, after final assembly, connector 15 and diaphragm 17 are floating in the housing 11 which means that there are no forces, in the de-energization state of device 10, acting against bead 16.

In prior art devices, it was thought necessary to provide some means to compress bead 16 into clearance 18 between housing 11 and connector 15. In one such device, the biasing spring 31 was made sufficiently large to force cup 30 against diaphragm 17, diaphragm 17 against connector 15 and connector 15 toward housing 11 to compress bead 16 into clearance 18. In another device, a tightening nut was provided to draw connector 15 towards housing 11 as it was tightened to thus compress bead 16.

The present device 10 is much simpler to assemble than prior art devices. There are no nuts to tighten in order to compress bead 16 into clearance 18 and there are no tight biasing springs to force the bead 16 into clearance 18 and at the same time impede assembly by making it necessary to fight the force of the springs.

The embodiments of the invention in which an exclusive property or right is claimed are defined as follows:

1. A fluidic device comprising:
   a housing;
   connector means mounted within said housing in a manner to provide a clearance therebetween, said connector means having a nozzle exteriorly of said housing; and,
   a diaphragm mounted within said housing and having a bead around the circumference of one end of said diaphragm, said bead positioned within said clearance between said connector means and said housing to form an expandable fluid chamber with said connector means, such that when fluid is supplied to said nozzle, and to said chamber, the fluid will force said bead into sealing relation with said housing and said connector means,
   said connector means, said housing and said bead being so dimensioned that, without fluid supplied to said nozzle, said connector means and said diaphragm with said bead are floating with respect to said housing.

2. The device of claim 1 wherein said bead has a first circumference and said connector means has a second circumference, said first circumference being less than said second circumference to form an interference fit between said diaphragm bead and said connector means to prevent fluid leaking from said housing upon small pressures of fluid being supplied to said chamber.

3. The device of claim 2 comprising an actuator stem, motion imparting means responsive to motion of said diaphragm for imparting said motion to said stem, said stem extending through said housing.

4. The device of claim 3 wherein said motion imparting means comprises a cup-shaped member.

5. A fluidic device comprising:
   a housing having a first circumference and an end having an opening therethrough of a second circumference less than said first circumference;
   connector means mounted within said housing and having a third circumference less than said first circumference but greater than said second circumference and providing a clearance between said housing and said connector means, said connector means having a nozzle exteriorly of said housing; and,
   a diaphragm mounted within said housing and having a bead around the circumference of one end of said diaphragm, the circumference around said one end of said diaphragm being slightly smaller than the third circumference of said connector means, said bead positioned within said clearance between said connector means and said housing to form an expandable fluid chamber with said connector means, such that when fluid is supplied to said nozzle, and to said chamber, the fluid will force said bead into sealing relation with said housing and said connector means,
   said connector means, said housing and said bead being so dimensioned that, without fluid supplied to said nozzle, said connector means and said diaphragm with said bead are floating with respect to said housing.

6. The device of claim 5 comprising an actuator stem, and motion imparting means responsive to motion of said diaphragm for imparting said motion to said stem, said stem extending through housing.

7. The device of claim 6 wherein said motion imparting means comprises a cup-shaped member.

8. The device of claim 7 further comprising a biasing spring for biasing said stem into said housing to a first de-energized position, said spring being insufficient to compress said bead between said housing and said connector means.

9. The actuator of claim 5 wherein said connector means has a tab therearound having a circumference at least slightly greater than said second circumference and said connector means further having a recess therearound having a circumference slightly less than said second circumference such that, after installation, said housing extends into said recess and said tab is exterior of said housing.

10. A fluid actuator comprising:
    a housing;
    connector means mounted within said housing in a manner to provide a clearance therebetween, said connector means having a nozzle exteriorly of said housing;
    a diaphragm mounted within said housing and having a bead around the circumference of one end of said diaphragm, said bead positioned within said clearance between said connector means and said housing to form an expandable fluid chamber with said connector means, such that when fluid is supplied to said nozzle, and to said chamber, the fluid will force said bead into sealing relation with said housing and said connector means;
    shaft means having a first end abutting said diaphragm and a second end extending through said housing;
    biasing means for biasing said shaft and said diaphragm into a first position when said fluid has not been supplied to said nozzle,
    said connector means, said housing, said bead and said biasing means being so dimensioned that, without fluid supplied to said nozzle, said connector means and said diaphragm with said bead are floating with respect to said housing.

11. The actuator of claim 10 wherein said housing has a first circumference and an end with an opening having a second circumference less than said first circumference and wherein said connector means has a third circumference less than said first circumference but greater than said second circumference and wherein said connector means projects through said opening such that said nozzle is exterior of said housing.

12. The actuator of claim 11 wherein said connector means has a tab therearound having a circumference at least slightly greater than said second circumference and said connector means further having a recess therearound having a circumference slightly less than said second circumference such that, after installation, said housing extends into said recess and said tab is exterior of said housing.

13. The actuator of claim 11 wherein said bead of said diaphragm has a circumference slightly less than said third circumference of said connector means such that an interference fit is formed when said diaphragm is stretched over said connector means to prevent leakages for small input pressures to said chamber.

14. The actuator of claim 13 wherein said shaft means comprises a cup-shaped member abutting said diaphragm and a shaft abutting said cup-shaped member and extending through said housing.

15. The actuator of claim 14 wherein said housing has a cap at a second end, said shaft extending through said cap and said biasing means extending between said cap and said cup.

16. The actuator of claim 15 wherein said connector means has a tab therearound having a circumference at least slightly greater than said second circumference and said connector means further having a recess therearound having a circumference slightly less than said second circumference such that, after installation, said housing extends into said recess and said tab is exterior of said housing.

* * * * *